(12) United States Patent
Diehl (10) Patent No.: US 9,369,340 B2
(45) Date of Patent: Jun. 14, 2016

(54) USER-CENTERED ENGAGEMENT ANALYSIS

(71) Applicant: Jive Software, Inc., Portland, OR (US)

(72) Inventor: Chris Diehl, Menlo Park, CA (US)

(73) Assignee: Jive Software, Inc., Portland, OR (US)

( * ) Notice: Subject to any disclaimer, the term of this patent is extended or adjusted under 35 U.S.C. 154(b) by 263 days.

(21) Appl. No.: 13/931,963

(22) Filed: Jun. 30, 2013

(65) Prior Publication Data

US 2015/0006715 A1     Jan. 1, 2015

(51) Int. Cl.
| | |
|---|---|
| *G06F 15/173* | (2006.01) |
| *H04L 12/24* | (2006.01) |
| *H04L 12/26* | (2006.01) |
| *H04L 29/08* | (2006.01) |

(52) U.S. Cl.
CPC .......... *H04L 41/069* (2013.01); *H04L 43/045* (2013.01); *H04L 43/067* (2013.01); *H04L 67/22* (2013.01)

(58) Field of Classification Search
CPC .......... G06N 3/08; G06N 3/049; G06Q 30/02
USPC ...................................................... 709/224
See application file for complete search history.

(56) References Cited

U.S. PATENT DOCUMENTS

| | | | | |
|---|---|---|---|---|
| 2009/0048904 A1* | 2/2009 | Newton | ............. | G06Q 30/0201 705/7.29 |
| 2010/0030578 A1* | 2/2010 | Siddique | ............. | G06Q 10/0637 705/3 |
| 2011/0010385 A1* | 1/2011 | Ridley | .................. | G06Q 30/02 707/769 |
| 2012/0324007 A1* | 12/2012 | Werz, III | ................ | G06Q 10/10 709/204 |
| 2013/0007132 A1* | 1/2013 | Sampson | ................ | H04L 67/22 709/204 |
| 2013/0204819 A1* | 8/2013 | Hunzinger | ............... | G06N 3/08 706/25 |

OTHER PUBLICATIONS

Hanna et al., "Reference Curves for the Gross Motor Function Measure: Percentiles for Clinical Description and Tracking Over Time Among Children With Cerebral Palsy," *Journal of the American Physical Therapy Association*, 12 pp. (May 2008).

Jive Software, Inc., PowerPoint presentation presented to a customer at an internal meeting depicting analysis techniques currently in development, approximately 5 people present, 8 pp. (Apr. 3, 2012).

* cited by examiner

*Primary Examiner* — Arvin Eskandarnia
(74) *Attorney, Agent, or Firm* — Klarquist Sparkman, LLP (57) ABSTRACT

Techniques for analyzing user engagement are provided. The techniques can include obtaining event records for one or more user activities, aggregating the event records to a temporal resolution, accumulating computed counts for each quantized time, and computing percentiles for the accumulated counts for each quantized time. The aggregating can include quantizing time to the temporal resolution; and computing counts for the event records for each quantized time. The one or more activities can be defined for one or more behavior classes.

20 Claims, 10 Drawing Sheets

USER-CENTERED ENGAGEMENT ANALYSIS

BACKGROUND

Businesses expend considerable resources on understanding user engagement on a given platform in order to provide better services and maintain users' attention. Different things compete for users' time and attention, so it is important for businesses to understand how the users interact with a particular site or service. Thus, analyzing user engagement is an important tool for understanding user behavior.

A common approach to analyzing user engagement is to count atomic user actions, such as viewing a page, creating a blog post, or writing a comment. Unfortunately, focusing on aggregate user action counts reveals little about the behavior of the underlying user population. Without an explicit characterization of the distribution of user activity, it may be difficult to assess the significance of the metrics or understand the underlying changes in user behavior affecting them.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In one embodiment, a method for analyzing user engagement is provided. The method includes obtaining event records for one or more user activities, aggregating the event records to a temporal resolution, accumulating computed counts for each quantized time, and computing percentiles for the accumulated counts for each quantized time. The aggregating includes quantizing time to the temporal resolution; and computing counts for the event records for each quantized time. The one or more user activities are defined for one or more behavior classes.

In another embodiment, a computing device adapted to perform the above method is provided. In yet another embodiment, a computer-readable storage medium storing computer-executable instructions for causing a processor programmed thereby to perform the above method is provided.

As described herein, a variety of other features and advantages can be incorporated into the technologies as desired.

DETAILED DESCRIPTION

Example 1

Exemplary Overview

By shifting the analysis of user engagement from user actions to users, an approach is offered to segmenting both behavior and user populations. Tracking particular user behavior over time offer insights into how the distribution of user behavior is changing. Two basic questions may be addressed: (a) how is the size of the active user population changing over time, and (b) how is user activity distributed over the active user population as a function of time?

In certain embodiments, user engagement is characterized on a given platform by decomposing it into three core classes of user behavior: consumption, creation and interaction. Further, three sets of user activities may be defined for the behavior classes. Based on these sets of user activities, the number of observed user events in each behavior class can be computed for each user as a function of time.

The user behavior time series can be used to generate visualizations for each behavior class. For example, one visualization, known as a user activity percentile chart, may show the evolution of specific distribution percentiles for cumulative user activity over time. These plots can be used in assessing user activity levels and rates among different user cohorts.

The specific decomposition of user engagement into particular user activity sets can be tailored to meet the needs of a service provider. Furthermore, variations on the basic user activity percentile chart can provide additional views into the dynamics of the user activity distribution.

As described herein, the embodiments can be performed on a "platform." The term "platform" may refer to any hardware or software platform, such as a website, an application, a database, or any other hardware and/or software system from which user behavior may be collected. For example, the platform may be a social media platform.

Examples of user engagement include viewing a document, viewing a blog post, creating a document and creating a blog post. User engagement is not limited to these activities and may include any activity that a user can perform with respect to a platform. In certain embodiments, the user engagement is done on an online platform. However, an offline platform may also be used. In this instance, the service provider need only collect data from the platform periodically in order to analyze user activity.

By analyzing user activity, a service provider may be able to observe how users are interacting with the platform over time. However, if only atomic user actions or total actions are viewed without regard to the user who is performing the action, the service provider is only able to view the particular actions, individually or in aggregate, at a given time. However, this information is not very helpful in determining how user behavior changes over time. For example, the more users on a platform, the more one would expect to see usage rise. However, without being able to view how individual users interact with the platform, it is difficult to understand how users generally are engaging with the platform.

Thus, in order to analyze user engagement, information on the activities of a user with regard to the platform needs to be analyzed. After collecting records of user activities performed on the platform for each user, the collected records may be counted as a function of time. After counting the collected records, the counts can be aggregated to produce a cumulative count of activities over time for each user. This information can be displayed to the service provider in the form of, for example, a chart. Further, percentile information at various percentiles may be plotted, providing the service provider a picture of how the behavior of the user community is changing.

In any of the embodiments herein, the term "service provider" is used. A service provider can refer to any entity that provides the platform, administers the platform, provides the content for the platform, tracks user activities on the platform, and/or uses user activity information. A service provider can also provide more than one of the aforementioned roles. A service provider may also change roles. For example, a service provider may initially provide the platform, but later change to monitoring the platform.

Example 2

Exemplary Method for Analyzing User Engagement Online

Figure 1:
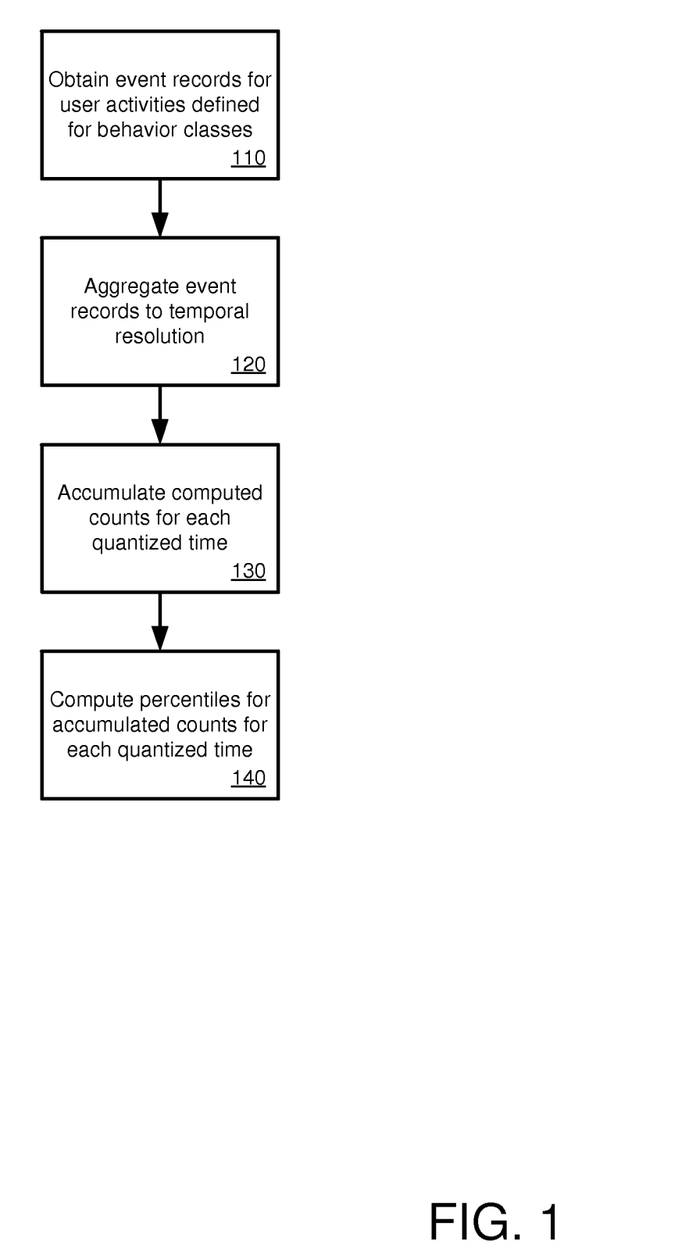
FIG. 1 is a flowchart of an exemplary method for analyzing user engagement.

FIG. 1 is a flowchart of an exemplary method for analyzing user engagement online. At 110, event records are obtained for one or more user activities. In any of the embodiments herein, an event record can be any record of an action that is performed with respect to the platform. The event records may be obtained from a global event stream, a platform specific stream, a log file, or from any source that contains records of user activities. The event records may be in the form of an ordered list, a string of characters, an encrypted file, or any other collection of user activities with respect to the platform.

Further, in any of the embodiments herein, a user activity may refer to an activity that can be performed by a user with regard to the platform. Examples of user activities include viewing a document, viewing a blog post, creating a document, creating a blog post, viewing a video clip, listening to an audio clip, posting a comment, liking a document, etc. For example, a user of an online social networking application supporting multiple users can interact with the application to perform a user activity in relation to various types of content, such as posting text, video, or picture content (e.g., in the form of blog posts, documents, email messages, etc.), reading content posted by others, interacting with content (e.g., indicating a preference or an association, such as a like or a recommendation), etc. The user activities are not limited to those activities described above and can include any activity that can be performed with respect to the platform.

Each of the user activities can be defined for one or more behavior classes. In any of the embodiments herein, the behavior classes may include consumption, creation, and interaction. The behavior classes are not limited to creation, consumption, and interaction, and may include any behavior class that the service provider defines to capture user activities. For example, a service provider could further define a behavior class for a subset of the above behavior classes, e.g., comments, or define a behavior class for a different group of user activities, e.g., administration. Each user activity is defined as belonging to one of the behavior classes. However, a particular user activity is not limited to a single behavior class, and may belong to one or more or none of the above behavior classes.

An example of defining user activities for a behavior class is provided. For example, the consumption behavior class can include the following user activities: view document, view blog post, view video clip, listen to audio clip, view comment, and view image. As new types of content that may be consumed are added to the platform, the user activities related to the consumption of this content can be added to the consumption behavior class. For example, if a play game user activity is known, this user activity can be defined for the consumption behavior class. Further, the play game user activity may also be defined for the interaction behavior class. The play game user activity may also be broken down into distinct activities that each exclusively belong to one of the behavior classes.

Alternatively, there may be a generic user activity that captures the user activities that have not been defined for the behavior classes. Thus, the generic user activity may be defined for one of the behavior classes, may be defined for its own behavior class, or may just be discarded. Further, the platform may attempt to categorize the user activity into one of the defined user activities based on one or more rules.

As the event records are read or received, they are filtered into one of the behavior classes based on the user activities defined for the behavior classes. For example, if an event record for a create document event is read, the event record is filtered to the creation behavior class. Specifically, if a create document event is read, the event is compared with the different activities defined for the behavior classes. If the create document event matches one of the user activities, in this case, the create document user activity defined for the creation behavior class, the create document event will be filtered to the behavior class that the user activity is defined for, in this case, the creation behavior class.

At 120, the event records are aggregated to a temporal resolution. For example, if the service provider wishes to track activity by days, the event records for each user ID is aggregated by day to provide a count per day of each user's activity for each recorded day. For example, the event records for a specific user ID on a specific date are counted to arrive at an event count for the user. Details of the aggregating will be further explained below.

At 130, computed counts are accumulated for each quantized time. The aggregated event records are cumulatively counted for each user over time for each behavior class. As will be described in more detail below, for each user, the time is stepped through and the counts are added to determine the count at that time.

At 140, percentiles are computed for the accumulated counts for each quantized time. These percentiles may be presented in different formats. For example, the various percentiles can be viewed in the form of a chart. Further, if a service provider wishes to see the engagement at the 90th percentile, the percentile data may be plotted on the chart. Further details will be described below.

Example 3

Defining User Activities for Behavior Classes

Figure 2:
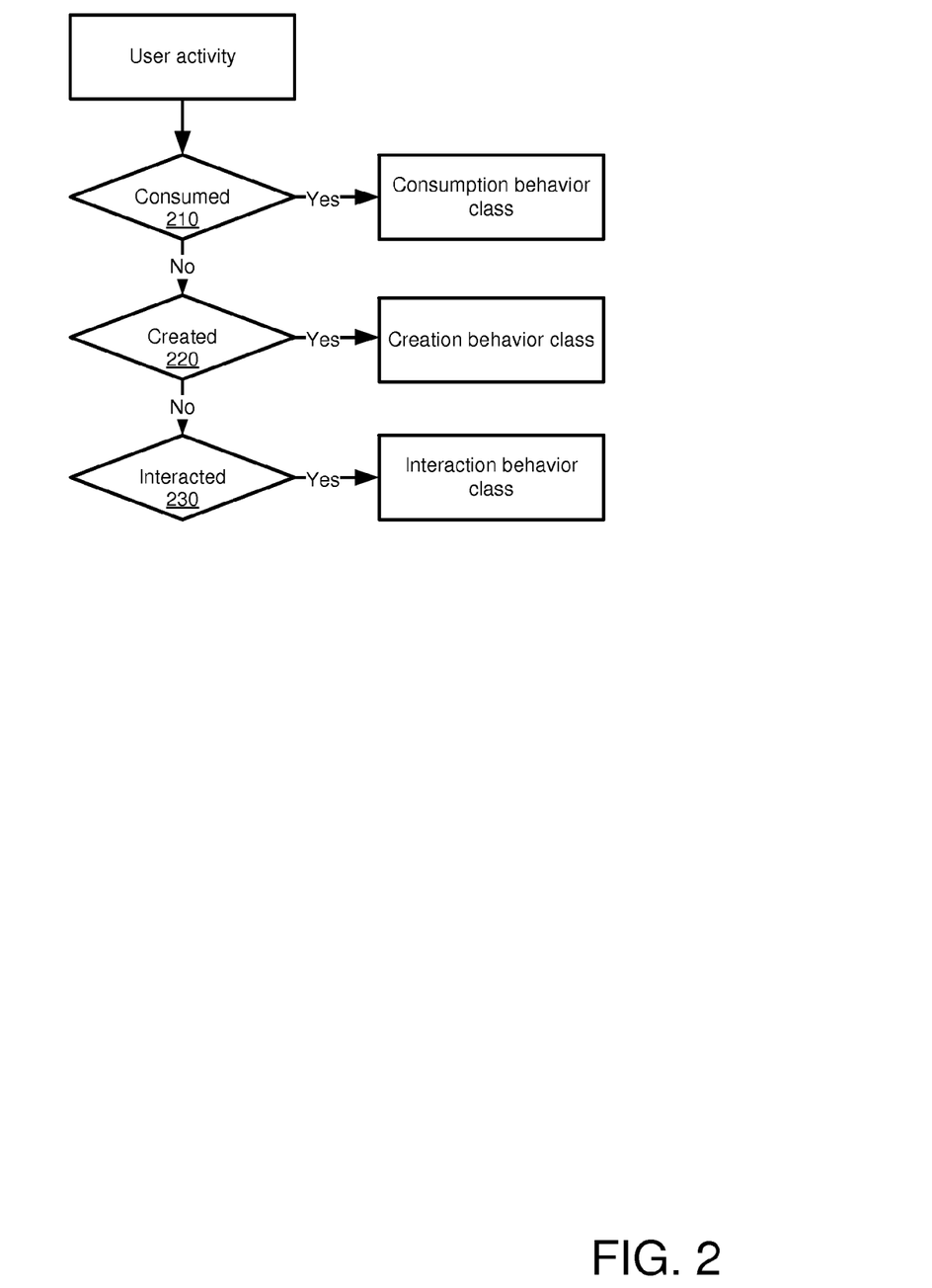
FIG. 2 is a flowchart depicting an example of defining user activities for behavior classes.

FIG. 2 is a flowchart depicting an example of defining the user activities for the behavior classes. As shown in FIG. 2, user activities to be included in a behavior class are defined for one of the behavior classes. However, as described in the Example 2 section above, a user activity may also be defined for more than one behavior class.

As described in the Example 2 section above, the behavior class may be one of creation, consumption, or interaction. Alternatively, different behavior classes may also be defined.

The specific behavior classes used can depend on the type of user activity occurring on the platform (e.g., on the system or application).

As shown in FIG. 2, a user activity is described for the platform. For example, a view document user activity may be described for the platform.

Each described user activity is defined for the behavior classes. For example, if the user activity is consumed 210, e.g., view document or view blog post, that user activity is defined for the consumption behavior class. If the user activity is created 220, that user activity is defined for the creation behavior class. If the user activity is interacted 230, that user activity is defined for the interaction behavior class.

By breaking down user activities into behavior classes, a service provider can decide which activities to track and how to organize these activities in a manner useful to the service provider. Specifically, by organizing user activities into behavior classes, the service provider is better able to analyze the data and further their understanding of the users' behavior. Alternatively, user activities can be organized in a different manner (other than grouping by behavior class) or user activities can be monitored without grouping by behavior class (e.g., the user activities can each be treated individually).

Example user activities that may be defined for the consumption behavior class include view document, view blog post, view video clip, and listen to audio clip. Example user activities that may be defined for the creation behavior class include create document, create blog post, create video clip, and create audio clip. Example user activities that may be defined for the interaction behavior class include comment on blog post, share URL, and like comment.

For an illustrative example defining a user activity for the behavior classes, comment on blog post may be used. As shown in FIG. 2, the comment on blog post user activity may be described. At 210, it is determined whether the comment on blog post user activity is consumed. Since the comment on blog post is not consumed, the process goes to 220. At 220, it is determined whether the comment on blog post user activity is created. Since the comment on blog post is not created, the process goes to 230. At 230, it is determined whether the comment on blog post user activity is interacted. Here, it is determined that the comment on blog post user activity is interacted, and thus, is defined for the interaction behavior class. If the comment on blog post user activity was not defined for the interaction behavior class, the comment on blog post user activity would not be defined for any of the example behavior classes and thus would not be capture by the method described in the Example 2 section above. For each of the user activities, the same process as was shown for the comment on blog post user activity is performed until all of the user activities have been defined for the behavior classes.

Example 4

Filtering Global Event Stream to User Activities

A global event stream may be provided to the service provider. The global event stream is a stream containing all, or a portion, of the events that occur with regard to the platform. The global event stream may be a stream of data containing the time, the user ID, the user action, and the artifact target.

In any of the embodiments herein, user action may refer to an action performed by a user with regard to the platform. For example, a user action may be view, create, comment, etc. In any of the embodiments herein, artifact target may refer to the content upon which the user action is performed. For example, if the user action is view, the artifact target may be document or blog post. An artifact target may be associated with one or more user actions and a user action may be associated with one or more artifact targets. For example, the document artifact target may be associated with a create user action, view user action, and forward user action. Alternatively, a user action may be combined with the artifact target, e.g., create document.

The event record is stored by the platform. The platform may store the event record in a file, a database, in memory, or any other manner of storage. The event records may be stored locally on the platform, on a server, in a cloud computing environment or any system or apparatus that may store records.

In some embodiments, the stored event record has the format of [milliseconds since epoch (time), user ID, user action, artifact target]. This format is only one example and an event record may contain more or fewer element or different elements. For example, instead of milliseconds since epoch, a date time stamp may be included. Further, the user action and artifact target may be combined in a single element.

As the global event stream is being provided to the service provider, the events are filtered and stored as event records. For example, if a view document user activity or view blog post user activity was defined for the consumption behavior class, an event that matches one of those user activities may be filtered and stored as [Milliseconds, User ID, View, Document] OR [Milliseconds, User ID, View, Blog Post] for the consumption behavior class. If a create document user activity or create blog post user activity was defined for the creation behavior class, an event that matches one of those user activities may be filtered and stored as [Milliseconds, User ID, Create, Document] OR [Milliseconds, User ID, Create, Blog Post] for the creation behavior class. Thus, each of the filtered events is stored for at least one of the one or more behavior classes.

Each of the event records may have a different format. For example, if some of the captured events contained a date time stamp and other events contained milliseconds since epoch, both of these types of event records may be stored together. For example, one record may appear as [Milliseconds, User ID, Create, Document] and the next record may appear as [Date Time Stamp, User ID, Create, Blog Post]. As will be described later, the event records will be transformed so that varying event records may be processed. Furthermore, an event need not contain all of the elements of the event record format. For example, the event record may be appear as [Milliseconds, Create, Document]. In that event, any of the embodiments may provide rules to handle the missing element. For example, a default user ID may be used.

Example 5

Aggregating User Activities to Temporal Resolution

Figure 3:
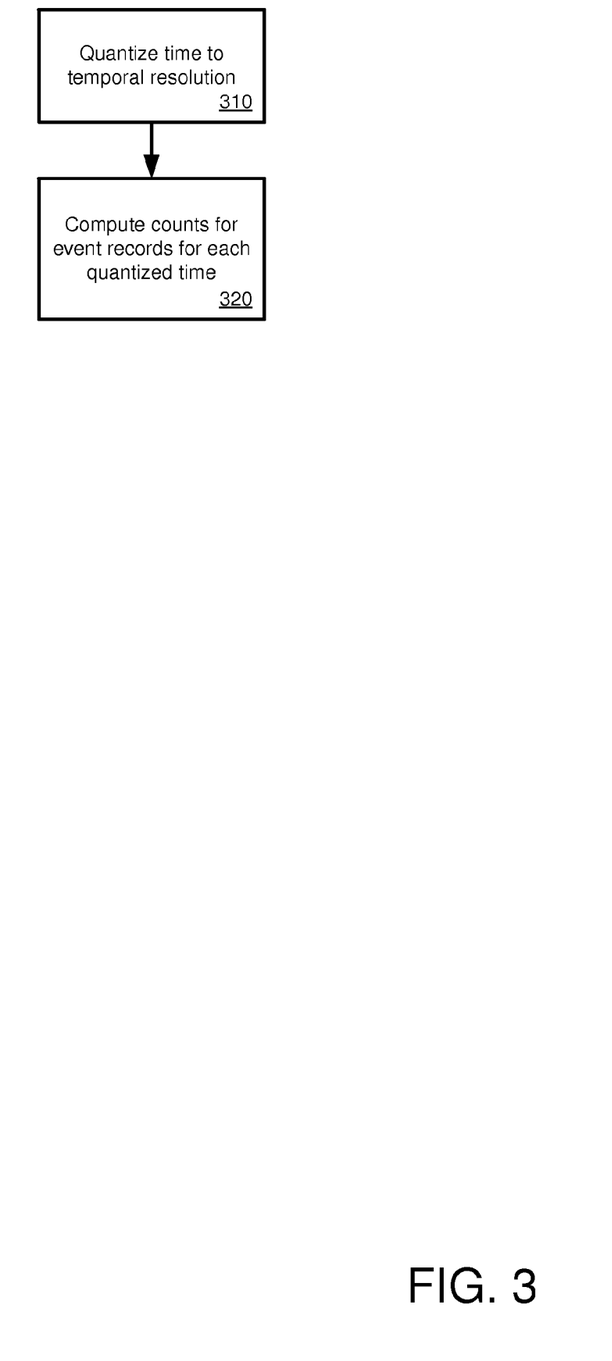
FIG. 3 is a flowchart depicting an example of aggregating user activities to a temporal resolution.

FIG. 3 is a flowchart depicting an example of aggregating the event records to a temporal resolution. The temporal resolution can be any temporal resolution (e.g., a user-selected temporal resolution or a system-defined temporal resolution).

At 310, the time from the event records is quantized to a temporal resolution. The temporal resolution is the smallest time for which the event records are to be quantized. For example, if the event record is recorded in milliseconds since epoch, the time may quantized to the temporal resolution of, for example, one day. The temporal resolution may be one day or a range of days. The temporal resolution may also be a weekly resolution, a number of hours, or any other period of time that the event record time may be resolved to. Further, the time from the event record may already be at the temporal resolution, and thus, no further quantization is required. Further, different sets of event records may be quantized at different resolutions, providing sets of event records with different quantized time. The granularity of the quantized time may be set by default or may be determined by the service provider.

At 320, event counts for the event records are computed for each quantized time for each user. Since the time from each event record has been quantized, for a given user activity, one or more event records may exist for that time for a particular user. Further, since a behavior class may contain one or more user activities, more than one event record may exist for the behavior class for a given time for a particular user. Thus, event counts are computed for each quantized time for each user. For example, on a particular date, a user may have viewed a document twice and viewed a blog post once. Thus, for that user for that date, his event count would be 3.

Another format may be provided to collect the event count records, e.g., [quantized time, user ID, event count]. For example, if a user has a "view blog post" event record and a "view document" event record for a specific date, the event count record may be stored as [date, user ID, 2]. If the user also has a "create blog post" for that date, the event count record would not be incremented, but would instead be stored as [date, user ID, 1]. In order to distinguish the behavior class in the event count record, the behavior class may also be stored in the event count record. Alternatively, the records for a behavior class may be stored separately or processed separately to ensure that only those records for a particular behavior class are counted.

Example 6

Accumulating Computed Counts for Quantized Time

The computed counts may be accumulated for each user over quantized time. Each quantized time is stepped though. At that quantized time, a cumulative count is determined for that time. For example, if a user has an event count of 5 for day 1 and 4 for day 2, the accumulated count for day 2 would be 9 (5+4) on day 2.

A format may be provided for the accumulated counts for the quantized time: [quantized time, user ID, cumulative number of events observed up to given time]. This format allows the accumulated counts to be saved in a quickly digestible format. For each user ID, a count of the aggregated user activities up to a given time are collected. This cumulative number is a sum of the computed count for each quantized time by user ID.

However, the above format need not be used. For example in the previous example, instead of collecting event counts for each quantized time, an accumulated count may be computed from the filtered user activities.

Using the example described above, if the event count for day 3 is 5, the accumulated count would be 14 (9 or (5+4)+5) on day 3.

Example 7

Computing Percentiles

Figure 4:
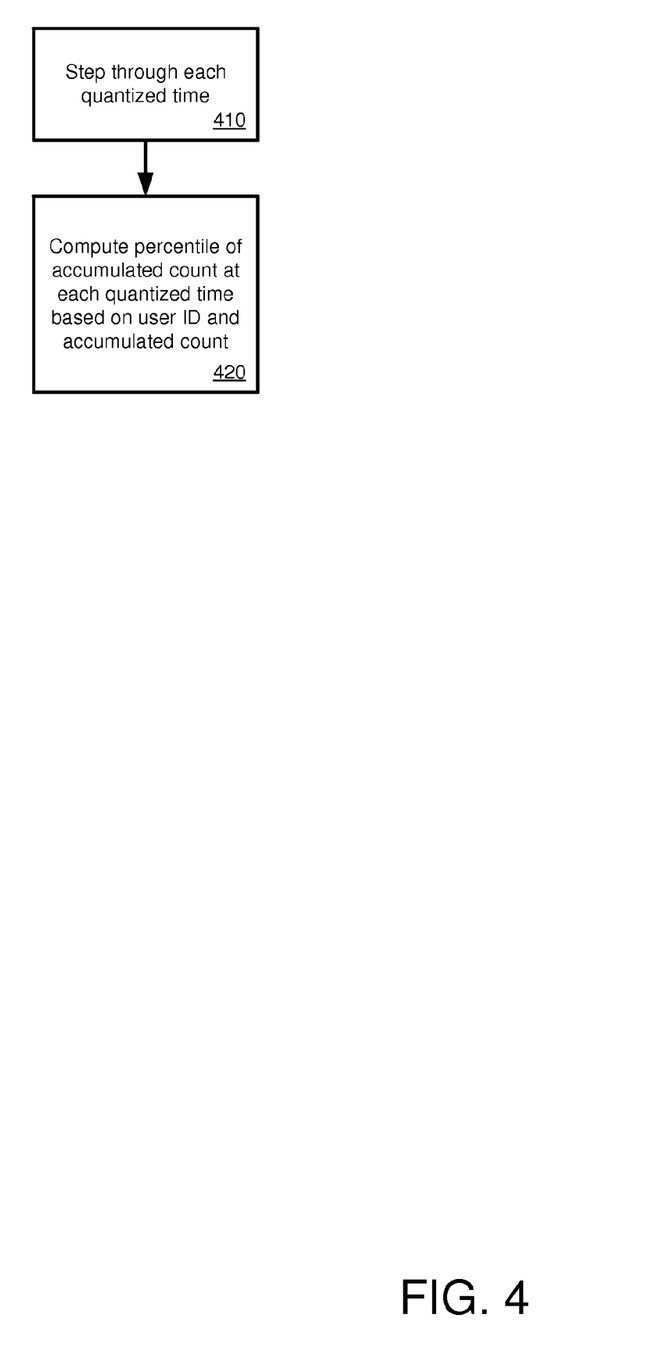
FIG. 4 is a flowchart depicting an example of computing percentiles of user event count distributions for each quantized time.

FIG. 4 is a flowchart depicting an example of computing percentiles (e.g., user-selected or desired percentiles) of user event count distribution at each quantized time. For example, if the user activity is monitored and saved as event records for a plurality of days, and if the event records are accumulated based on a quantized temporal resolution of one day, then one or more percentiles can be computed for each time period of one day.

At each quantized time, the accumulated counts are analyzed. The accumulated counts can be broken down into percentiles to allow for analysis of the collected user activity data. In any of the embodiments herein, a percentile represents one or more user records at a given percent. For example, if a service provider wishes to see data for the 90th percentile, the list of users may be ordered and the user record at 90 percent of the records may be selected.

First, each quantized time is stepped through. For example, if the temporal resolution is one day, each day is stepped through, i.e., day 1, day 2, day 3, etc. At each stepped-though quantized time, for a specified percentile, the percentile is computed based on the user ID and accumulated count.

The percentile may be computed by ordering the users at a specific date by accumulated count and selecting the user at the specific percentile. Alternatively, any other method of obtaining a value at a percentile number may be used. For example, a weighted average, an average of a range, or some other formula may be used to obtain the percentile. Further, the percentile may be interpolated from more than one user. For example, a range of users may be collected for the percentile, and a formula may be applied to obtain the percentage.

Example 8

Exemplary User Percentile Charts

Figure 5:
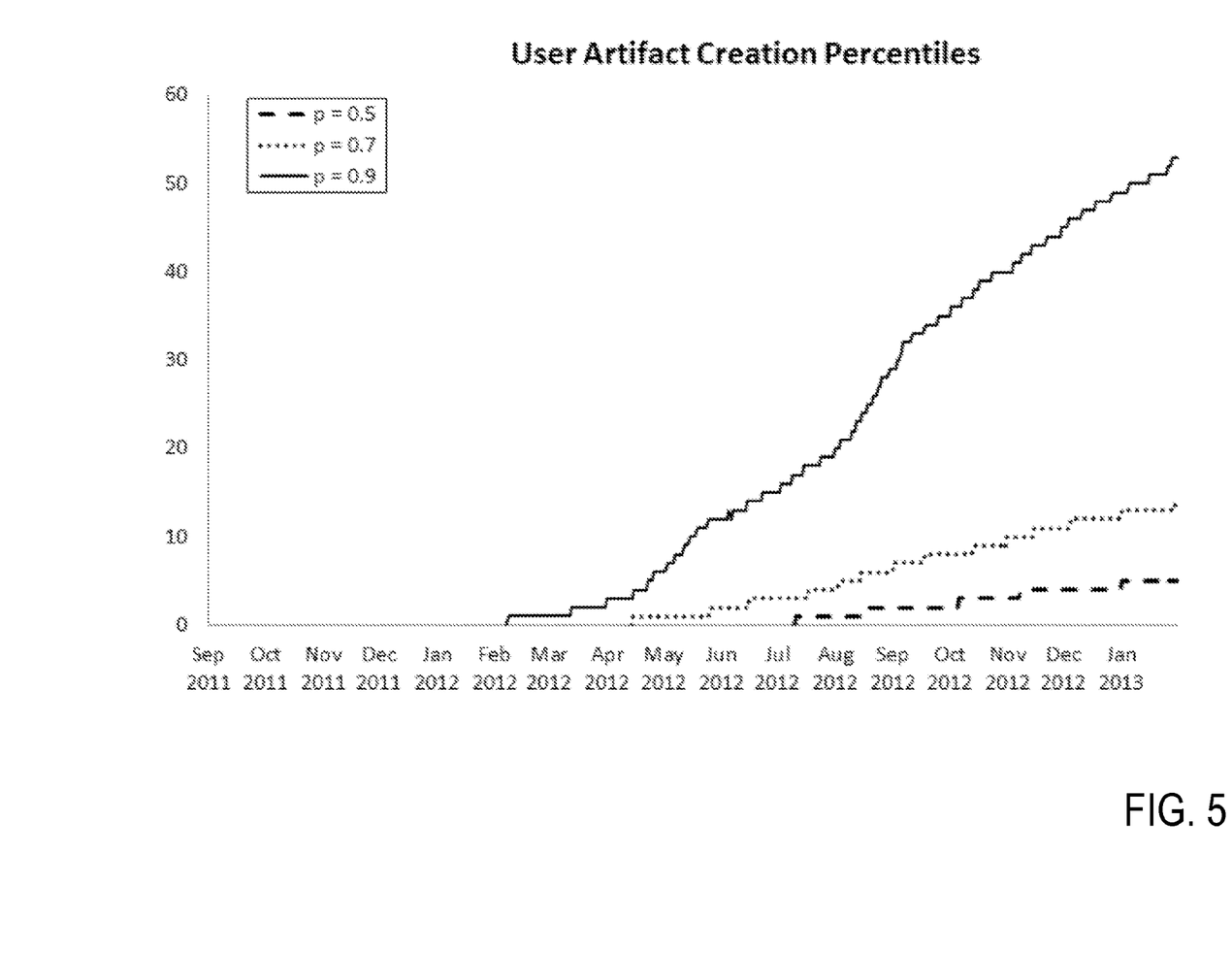
FIG. 5 is a chart depicting an example of user artifact creation percentiles.
Figure 6:
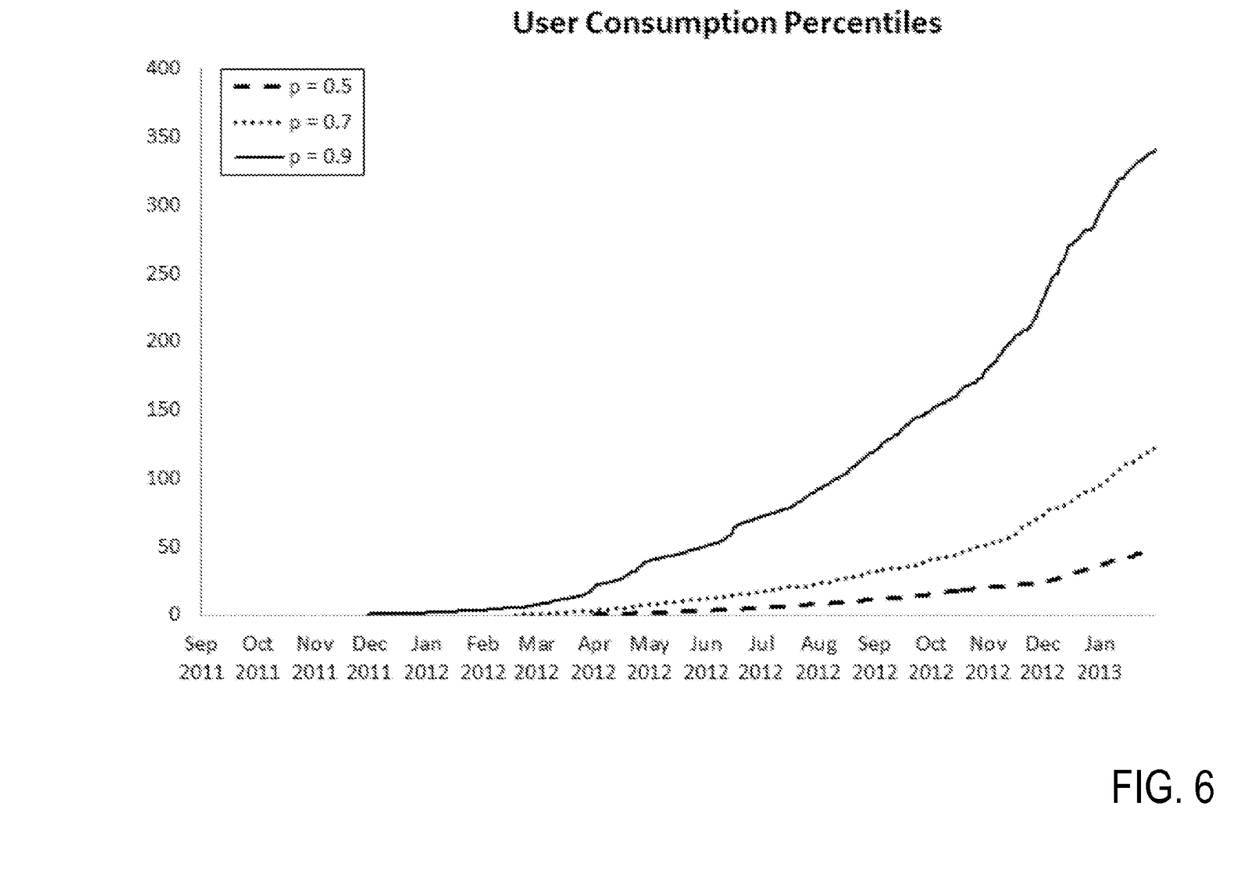
FIG. 6 is a chart depicting an example of user consumption percentiles.
Figure 7:
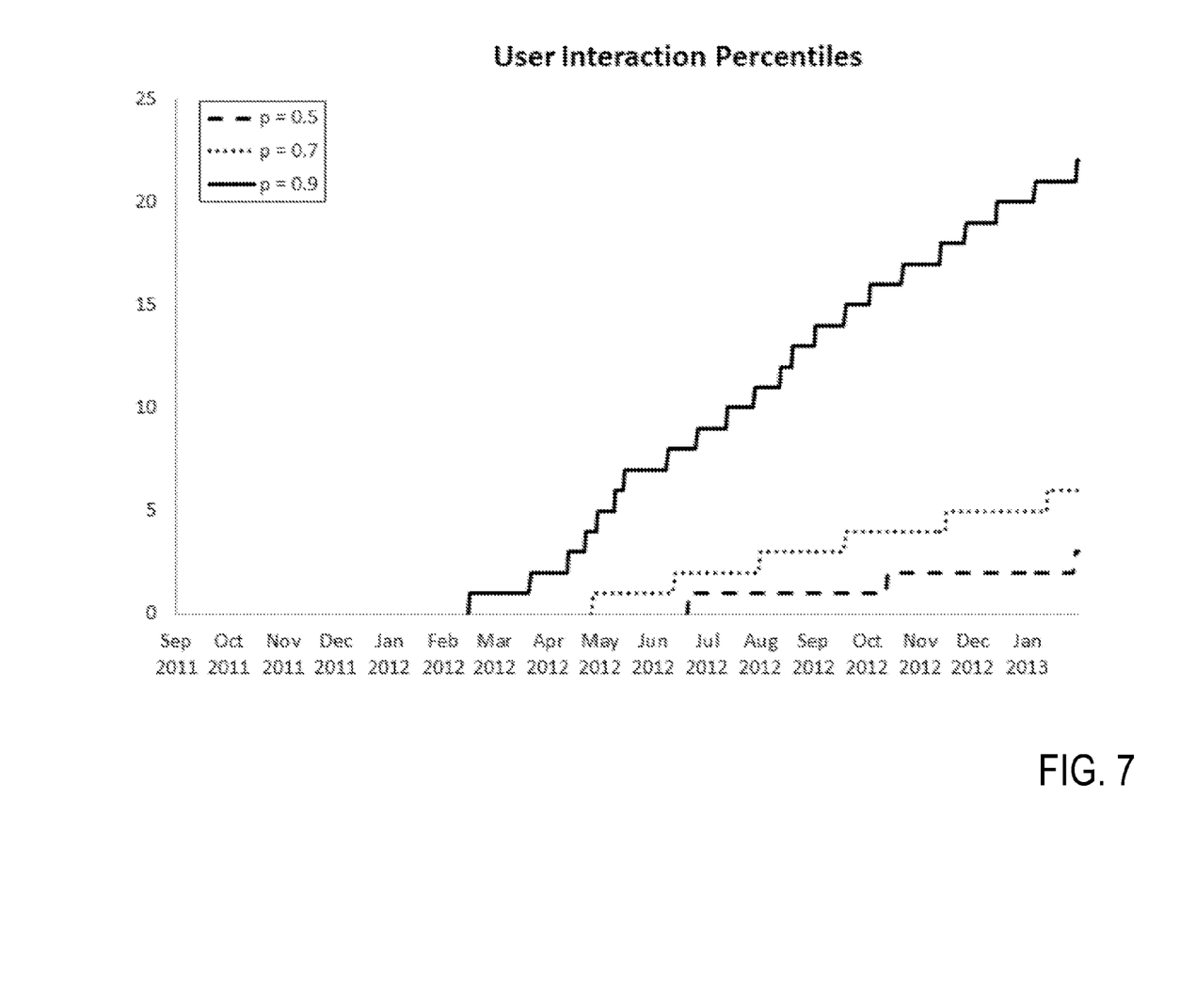
FIG. 7 is a chart depicting an example of user interaction percentiles.

FIGS. 5-7 are exemplary charts showing user activity percentiles. For each of the one or more behavior classes, the percentiles may be charted for the accumulated counts over time. For example, FIG. 5 displays an exemplary chart showing user artifact creation percentiles, FIG. 6 displays an exemplary chart showing user consumption percentiles, and FIG. 7 displays an exemplary chart showing user interaction percentiles.

The percentiles may be charted for the 50, 70, and 90 percentiles for the accumulated counts over time. However, the chart need not be charted for the 50, 70, and 90 percentiles and may be any percentiles determined by the service provider. In FIGS. 5-7, single points are charted for each percentile. However, a range may also be charted. For example, the values for the 85-95 percentiles may be charted showing a range of user activities. Further, the chart need not be a chart over dates, and may be a chart showing day of the week, certain notable events, or any other days or dates collected by the service provider.

By choosing percentiles that are not at either end of the range, outliers can be eliminated. For example, if one particular user only visited the platform once and never used it again, that information may not be beneficial to determining user engagement. On the other end of the range, if a user used a program to visit the platform an extremely large number of times, the service provider may not find that information to be particularly useful either.

Example 9

Exemplary Sample Creation of User Consumption Percentiles Chart

Below is described the creation of a User Consumption Percentiles chart using sample data. A sample 50 record data set using a data range of Jan. 1, 2013 to Jan. 10, 2013, and number of users=5 was used.

Using the method described in the Example 2 section above and shown in FIG. 1, the event records are obtained for the user activities. In this example, only the "user consumption" behavior class is defined. Further, only "viewed document" and "viewed blog post" user activities are defined for the user consumption behavior class. Here, the global event stream is filtered into the table shown at Table 1.

TABLE 1

Filtered global events (total records = 50)

| Date/Time Stamp | User ID | User Action | Artifact Target |
|---|---|---|---|
| 01-Jan-13 10:03:22 | 2 | view | blog post |
| 01-Jan-13 15:20:10 | 1 | view | document |
| 02-Jan-13 8:12:29 | 3 | view | blog post |
| 02-Jan-13 10:19:12 | 4 | view | document |
| 02-Jan-13 11:22:34 | 5 | view | document |
| 02-Jan-13 11:28:19 | 1 | view | document |
| 02-Jan-13 12:15:50 | 2 | view | blog post |
| 02-Jan-13 12:21:54 | 2 | view | blog post |
| 03-Jan-13 10:50:53 | 5 | view | blog post |
| 03-Jan-13 12:25:55 | 2 | view | document |
| 03-Jan-13 13:59:31 | 1 | view | blog post |
| 03-Jan-13 15:59:02 | 2 | view | blog post |
| 04-Jan-13 9:18:43 | 1 | view | blog post |
| 04-Jan-13 10:20:38 | 4 | view | blog post |
| 04-Jan-13 11:09:36 | 2 | view | document |
| 04-Jan-13 12:38:53 | 2 | view | blog post |
| 04-Jan-13 14:58:34 | 5 | view | document |
| 05-Jan-13 8:49:55 | 1 | view | document |
| 05-Jan-13 8:58:34 | 1 | view | blog post |
| 05-Jan-13 11:48:29 | 2 | view | document |
| 05-Jan-13 13:42:14 | 1 | view | document |
| 05-Jan-13 13:48:00 | 1 | view | blog post |
| 05-Jan-13 14:12:10 | 1 | view | blog post |
| 06-Jan-13 8:55:41 | 3 | view | document |
| 06-Jan-13 9:28:48 | 2 | view | blog post |
| 06-Jan-13 10:50:53 | 1 | view | document |
| 06-Jan-13 15:41:46 | 1 | view | document |
| 07-Jan-13 9:04:19 | 1 | view | document |
| 07-Jan-13 9:24:29 | 1 | view | blog post |
| 07-Jan-13 12:50:24 | 1 | view | document |
| 08-Jan-13 7:52:19 | 5 | view | document |
| 08-Jan-13 8:00:58 | 1 | view | document |
| 08-Jan-13 8:45:36 | 1 | view | blog post |
| 08-Jan-13 9:11:31 | 2 | view | document |
| 08-Jan-13 10:32:10 | 2 | view | blog post |
| 08-Jan-13 13:19:12 | 2 | view | blog post |
| 08-Jan-13 14:32:38 | 4 | view | document |
| 09-Jan-13 7:59:31 | 1 | view | document |
| 09-Jan-13 9:10:05 | 2 | view | document |
| 09-Jan-13 13:29:17 | 3 | view | document |
| 09-Jan-13 14:09:36 | 1 | view | blog post |
| 09-Jan-13 14:19:41 | 1 | view | blog post |
| 09-Jan-13 14:29:22 | 1 | view | blog post |
| 09-Jan-13 16:17:51 | 1 | view | blog post |
| 10-Jan-13 8:18:14 | 1 | view | blog post |
| 10-Jan-13 8:47:02 | 1 | view | document |
| 10-Jan-13 10:16:19 | 1 | view | document |
| 10-Jan-13 10:46:34 | 2 | view | blog post |
| 10-Jan-13 12:53:17 | 1 | view | document |
| 10-Jan-13 16:20:38 | 1 | view | document |

Next, the event records are aggregated to a temporal resolution. As shown in Table 2, the temporal resolution is one day. The event records are aggregated to arrive at an event count for each user for each date. As can be seen from the data below, the total number of records is reduced to 29 since a particular quantized time and user combination may yield more than one event. For example, as shown in Table 1, on January 2, user 2 performed 2 view blog post events (at 12:15:50 and 12:21:54). Thus, as shown in Table 2, for January 2, user 2 has an event count of 2.

TABLE 2

Aggregated user activities (total records = 29)

| Quantized Time | User ID | Event Count |
|---|---|---|
| Jan. 01, 2013 | 1 | 1 |
| Jan. 01, 2013 | 2 | 1 |
| Jan. 02, 2013 | 1 | 1 |
| Jan. 02, 2013 | 2 | 2 |
| Jan. 02, 2013 | 3 | 1 |
| Jan. 02, 2013 | 4 | 1 |
| Jan. 02, 2013 | 5 | 1 |
| Jan. 03, 2013 | 1 | 1 |
| Jan. 03, 2013 | 2 | 2 |
| Jan. 03, 2013 | 5 | 1 |
| Jan. 04, 2013 | 1 | 2 |
| Jan. 04, 2013 | 2 | 1 |
| Jan. 04, 2013 | 4 | 1 |
| Jan. 04, 2013 | 5 | 1 |
| Jan. 05, 2013 | 1 | 5 |
| Jan. 05, 2013 | 2 | 1 |
| Jan. 06, 2013 | 1 | 2 |
| Jan. 06, 2013 | 2 | 1 |
| Jan. 06, 2013 | 3 | 1 |
| Jan. 07, 2013 | 1 | 3 |
| Jan. 08, 2013 | 1 | 2 |
| Jan. 08, 2013 | 2 | 3 |
| Jan. 08, 2013 | 4 | 1 |
| Jan. 08, 2013 | 5 | 1 |
| Jan. 09, 2013 | 1 | 5 |
| Jan. 09, 2013 | 2 | 1 |
| Jan. 09, 2013 | 3 | 1 |
| Jan. 10, 2013 | 1 | 5 |
| Jan. 10, 2013 | 2 | 1 |

Next, the computed event counts are accumulated over the quantized time. As shown in Table 3, a cumulative number of events are calculated for each user for each date. As can be seen from the data below, the total number of records has increased from 29 to 47. Since a particular user may not have any events for a particular date, a record for that user and date would not appear in the above table (Table 2). However, since Table 3 shows accumulated counts, a record for that user would still be available for the quantized time. Continuing with the example above, user 2 had an event count of 1 on January 1 and an event count of 2 on January 2. Thus, the cumulative number of events on January 2 for user 2 is 3 (1+3). Further, on January 3 the event count was 2, and so the cumulative count on January 3 is 5 (3+2).

TABLE 3

Accumulated computed counts (total records = 47)

| Quantized Time | User ID | Cumulative # of Events |
|---|---|---|
| Jan. 01, 2013 | 1 | 1 |
| Jan. 01, 2013 | 2 | 1 |
| Jan. 02, 2013 | 1 | 2 |
| Jan. 02, 2013 | 2 | 3 |
| Jan. 02, 2013 | 3 | 1 |
| Jan. 02, 2013 | 4 | 1 |
| Jan. 02, 2013 | 5 | 1 |
| Jan. 03, 2013 | 1 | 3 |
| Jan. 03, 2013 | 2 | 5 |
| Jan. 03, 2013 | 3 | 1 |
| Jan. 03, 2013 | 4 | 1 |
| Jan. 03, 2013 | 5 | 2 |
| Jan. 04, 2013 | 1 | 5 |
| Jan. 04, 2013 | 2 | 6 |
| Jan. 04, 2013 | 3 | 1 |
| Jan. 04, 2013 | 4 | 2 |
| Jan. 04, 2013 | 5 | 3 |
| Jan. 05, 2013 | 1 | 10 |
| Jan. 05, 2013 | 2 | 7 |
| Jan. 05, 2013 | 3 | 1 |

TABLE 3-continued

Accumulated computed counts (total records = 47)

| Quantized Time | User ID | Cumulative # of Events |
| --- | --- | --- |
| Jan. 05, 2013 | 4 | 2 |
| Jan. 05, 2013 | 5 | 3 |
| Jan. 06, 2013 | 1 | 12 |
| Jan. 06, 2013 | 2 | 8 |
| Jan. 06, 2013 | 3 | 2 |
| Jan. 06, 2013 | 4 | 2 |
| Jan. 06, 2013 | 5 | 3 |
| Jan. 07, 2013 | 1 | 15 |
| Jan. 07, 2013 | 2 | 8 |
| Jan. 07, 2013 | 3 | 2 |
| Jan. 07, 2013 | 4 | 2 |
| Jan. 07, 2013 | 5 | 3 |
| Jan. 08, 2013 | 1 | 17 |
| Jan. 08, 2013 | 2 | 11 |
| Jan. 08, 2013 | 3 | 2 |
| Jan. 08, 2013 | 4 | 3 |
| Jan. 08, 2013 | 5 | 4 |
| Jan. 09, 2013 | 1 | 22 |
| Jan. 09, 2013 | 2 | 12 |
| Jan. 09, 2013 | 3 | 3 |
| Jan. 09, 2013 | 4 | 3 |
| Jan. 09, 2013 | 5 | 4 |
| Jan. 10, 2013 | 1 | 27 |
| Jan. 10, 2013 | 2 | 13 |
| Jan. 10, 2013 | 3 | 3 |
| Jan. 10, 2013 | 4 | 3 |
| Jan. 10, 2013 | 5 | 4 |

Figure 8:
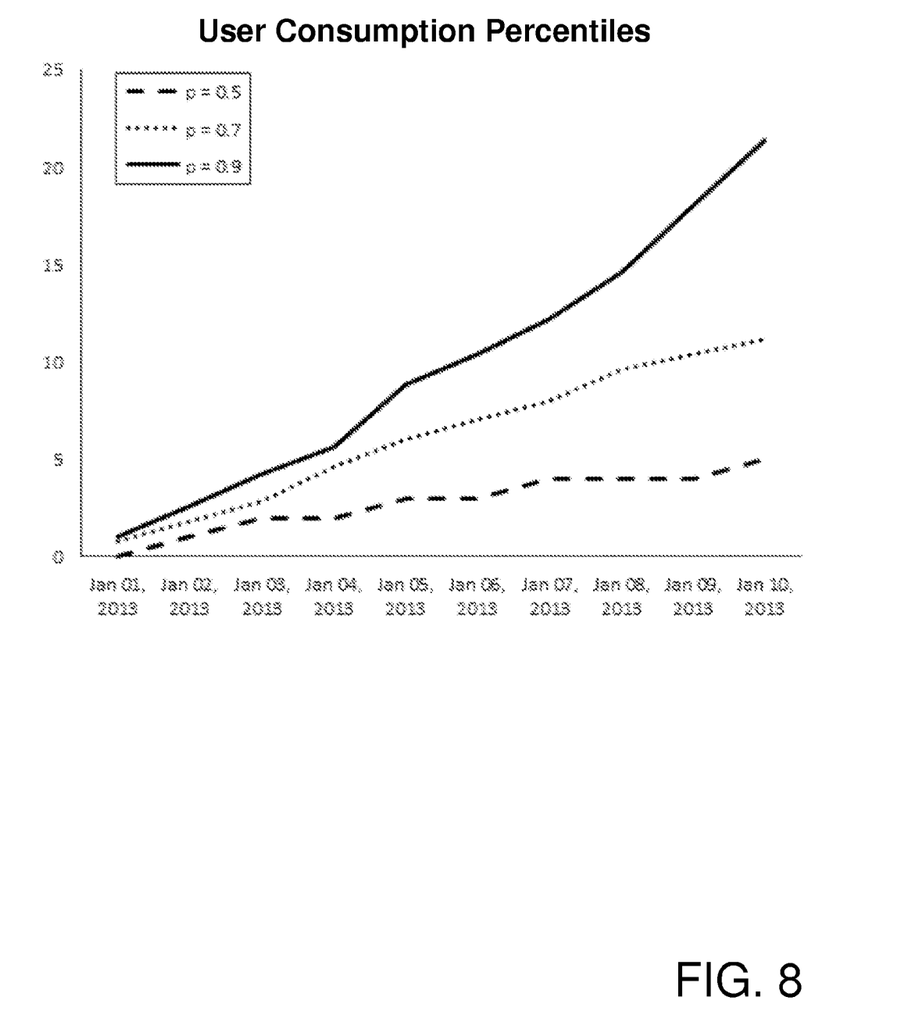
FIG. 8 is a chart depicting an example of user consumption percentiles using sample data.

Next, the percentiles are computed for each quantized time. FIG. 8 is an exemplary chart showing user consumption percentiles with the sample data. In this example the percentiles were set to 50, 70, and 90 percent. Because this example uses a small number of users, there may be no user exactly at each of the selected percentages. Therefore, the selected percentage values can be interpolated (e.g., using linear interpolation or another statistical method can be used). For example, the 70th percentile can be interpolated using the equation 0.8x+0.2y, where x=value found at the 75th percentile and y=value found at the 50th percentile. Similarly, the 90th percentile can be interpolated using the equation 0.6x+0.4y, where x=value found at the 100th percentile and y=value found at the 75th percentile.

For example, consider the cumulative event counts for January 10 for the 5 users as an ordered list as follows;

(User ID, count)–(ID3, 3), (ID4, 3), (ID5, 4), (ID2, 13), (ID1, 27)

If the count for user 3 is the value at the 0th percentile, and the count for user 1 is the value at the 100th percentile, the count for user 4 is the value at the 25th percentile, the count for user 5 is the value at the 50th percentile, and the count for user 2 is the value at the 75th percentile. Using the equation described above, the 90th percentile value can be interpolated. The value for x is the count for user 1 (i.e., 27) and y is the count for user 2 (i.e., 13). The equation 0.6x+0.4y (0.6*27+(0.4*13), yields 21.4 for the 90th percentile. The value of 21.4 is plotted on the line for the 90th percentile on the chart shown at FIG. 8.

The techniques described herein can be applied to provide better analysis for user engagement. For example, using existing techniques to analyze the example user activity depicted above in Table 1 would result in total creation events per day or total creation events up to a specific point in time. However, using the techniques described herein (e.g., as depicted above in Tables 2 and 3, and the resulting percentile graph results depicted in FIG. 8), a service provider, can easily determine user engagement on a more detailed basis, such as how a user's behavior changes over time.

Example 10

Exemplary Computing Systems

Figure 9:
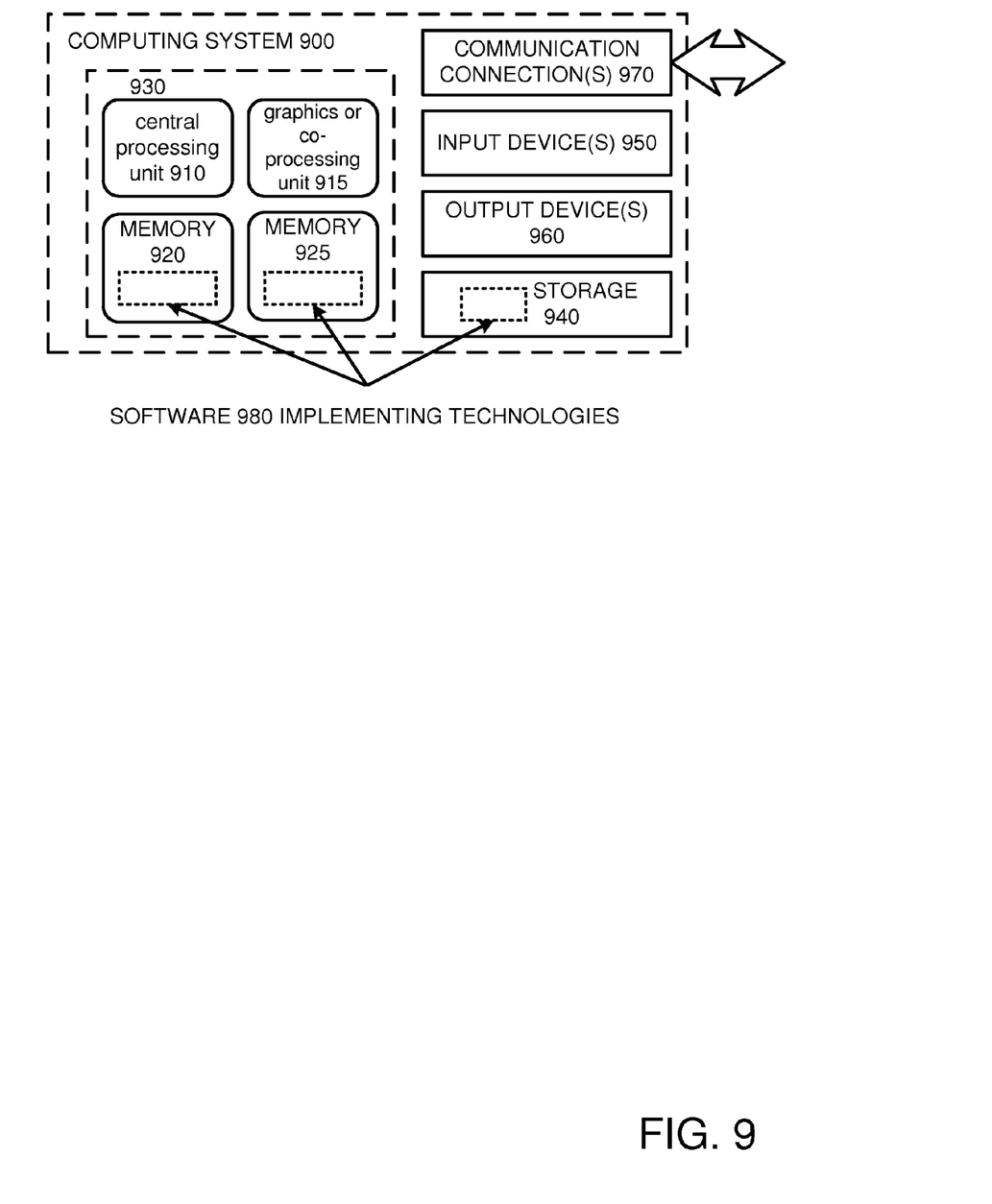
FIG. 9 is a diagram of an exemplary computing system in which described embodiments can be implemented.

FIG. 9 illustrates a generalized example of a suitable computing system 900 in which several of the described innovations may be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device (s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

Example 11

Exemplary Cloud-Supported Environment

Figure 10:
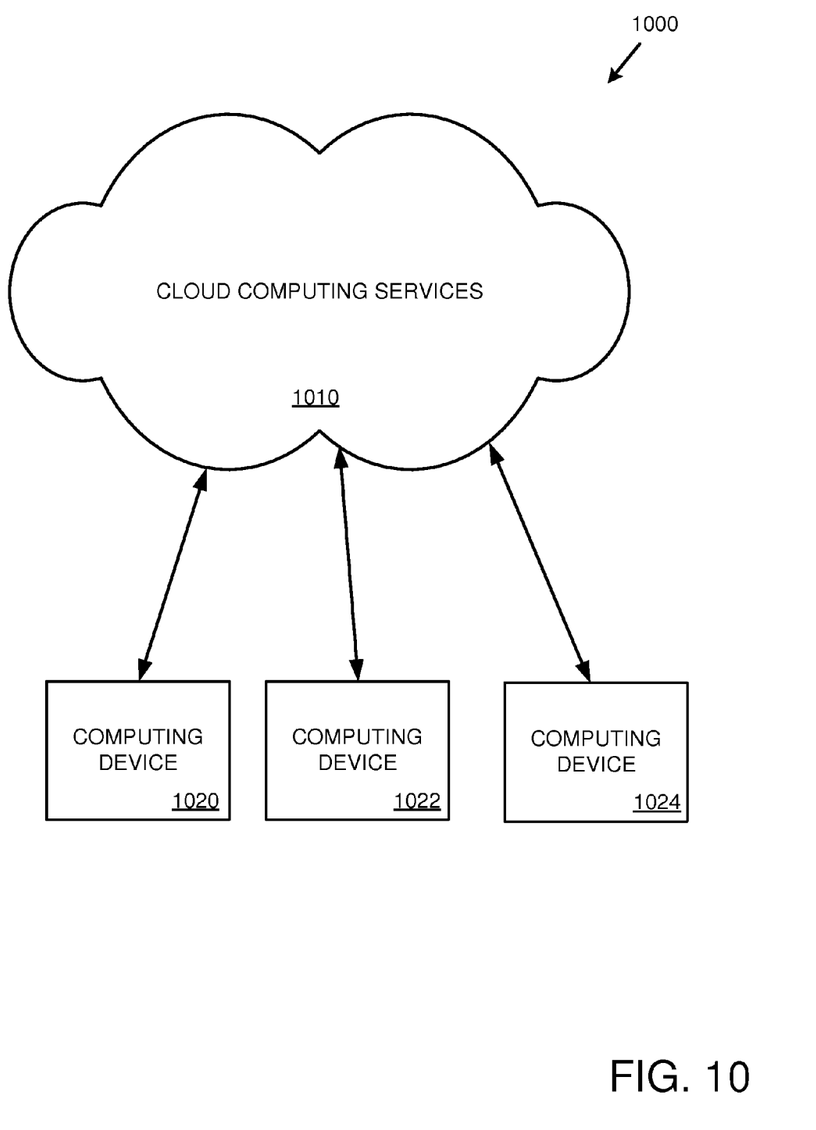
FIG. 10 is an exemplary cloud-support environment that can be used in conjunction with the technologies described herein.

FIG. 10 illustrates a generalized example of a suitable cloud-supported environment 1000 in which several of the described innovations may be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 12

Computer-Readable Media

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term computer-readable storage media does not include communication connections (e.g., 970) such as signals and carrier waves.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

I claim:

1. A method for analyzing user engagement comprising:
    associating multiple user activities with a plurality of behavior classes, wherein a user activity is associated with one or more behavior classes;
    obtaining event records for the multiple user activities;
    quantizing time to a temporal resolution, resulting in a plurality of quantized times;
    aggregating the event records, for each of the plurality of quantized times, for a behavior class of the plurality of behavior classes, wherein the aggregating comprises:
        identifying, for the quantized time, event records for activity types associated with the behavior class, and
        computing a count of the identified event records for activity types associated with the behavior class for the quantized time;
    accumulating the computed counts of event records for activity types associated with the behavior class for each quantized time; and
    computing percentiles for the accumulated counts of event records for activity types associated with the behavior class for each quantized time.

2. The method of claim 1, wherein the plurality of behavior classes comprises consumption, creation, and interaction.

3. The method of claim 1, wherein the event records comprise time, user id, user action, and artifact target.

4. The method of claim 2, wherein:
    the associating comprises associating viewed document and viewed blog post user activities with the consumption behavior class;
    the behavior class of the plurality of behavior classes is the consumption behavior class; and
    the aggregating comprises, for each of the plurality of quantized times, identifying event records for the viewed document and/or viewed blog post user activities.

5. The method of claim 2, wherein:
    the associating comprises associating create document and create blog post user activities with the creation behavior class;
    the behavior class of the plurality of behavior classes is the creation behavior class; and
    the aggregating comprises, for each of the plurality of quantized times, identifying event records for the create document and/or create blog post user activities associated with the creation behavior class.

6. The method of claim 1, wherein the temporal resolution is one day.

7. The method of claim 1, wherein the accumulating comprises:
    summing the computed counts for each quantized time by user ID.

8. The method of claim 1, further comprising:
    charting the percentiles for the accumulated counts of event records for activity types associated with the behavior class for each quantized time.

9. The method of claim 8, wherein the charting comprises charting 50, 70, and 90 percentiles for the accumulated counts over time.

10. A computing device adapted to perform a method for analyzing user engagement, the method comprising:
    associating multiple user activities with a plurality of behavior classes, wherein a user activity is associated with one or more behavior classes;
    obtaining event records for the multiple user activities;
    quantizing time to a temporal resolution, resulting in a plurality of quantized times;
    aggregating the event records, for each of the plurality of quantized times, for a behavior class of the plurality of behavior classes, wherein the aggregating comprises:
        identifying, for the quantized time, event records for activity types associated with the behavior class, and
        computing a counts of the identified event records for activity types associated with the behavior class for the quantized time;
    accumulating the computed counts for each quantized time for the behavior class; and
    computing percentiles for the accumulated counts for each quantized time, wherein the computing percentiles comprises:
        stepping through each quantized time,
        identifying, for each quantized time, accumulated computed counts for the behavior class, and
        computing a percentile of the accumulated count at each quantized time for the behavior class, wherein the percentile is based on a user ID and accumulated counts.

11. The computing device of claim 10, wherein the plurality of behavior classes comprises consumption, creation, and interaction.

12. The computing device of claim 10, wherein the event records comprise time, user id, user action, and artifact target.

13. The computing device of claim 11, wherein:
    the associating comprises associating viewed document and viewed blog post user activities with the consumption behavior class; and
    the aggregating comprises, for each of the plurality of quantized times, identifying event records for the viewed document and/or viewed blog post user activities associated with the consumption behavior class.

14. The computing device of claim 11, wherein:
    the associating comprises associating create document and create blog post user activities with the creation behavior class; and
    the aggregating comprises, for each of the plurality of quantized times, identifying event records for the create document and/or create blog post user activities associated with the creation behavior class.

15. The computing device of claim 10, wherein the temporal resolution is one day.

16. The computing device of claim 10, wherein the accumulating comprises:
    summing the computed counts for each quantized time by user ID.

17. The computing device of claim 10, wherein the method further comprises:

charting the percentiles for the accumulated counts for each quantized time for the behavior class.

18. A computer-readable storage medium storing computer-executable instructions for causing a processor programmed thereby to perform a method comprising:
- associating multiple user activities with a plurality of behavior classes, wherein a user activity is associated with one or more behavior classes;
- obtaining event records for the multiple user activities;
- quantizing time to a temporal resolution, resulting in a plurality of quantized times;
- aggregating the event records, for each of the plurality of quantized times, for a behavior class of the plurality of behavior classes, wherein the aggregating comprises:
  - identifying, for the quantized time, event records for activity types associated with the behavior class, and
  - computing a counts of the identified event records for activity types associated with the behavior class for the quantized time;
- accumulating the computed counts for each quantized time for the behavior class by user ID;
- computing percentiles for the accumulated counts for each quantized time, wherein the computing percentiles comprises:
  - stepping through each quantized time,
  - identifying, for each quantized time, accumulated computed counts for the behavior class, and
  - computing a percentile of the accumulated counts at each quantized time for the behavior class, wherein the percentile is based on user ID and accumulated count; and
- charting the percentiles for the accumulated counts for each quantized time for the behavior class.

19. The method of claim 7, wherein the computing the percentile comprises:
- defining the percentile as a number of summed counts at the quantized time.

20. The computing device of claim 7, wherein the computing the percentile comprises:
- defining a first percentile as a number of summed counts at the quantized time for a first user ID;
- defining a second percentile as a number of summed events at the quantized time for a second user ID;
- interpolating the percentile based on the first percentile and the second percentile.

* * * * *